R. H. DICK AND C. F. WOLTERS.
HEAT RESISTING SAFE OR CABINET.
APPLICATION FILED JUNE 12, 1918.
1,336,347. Patented Apr. 6, 1920.
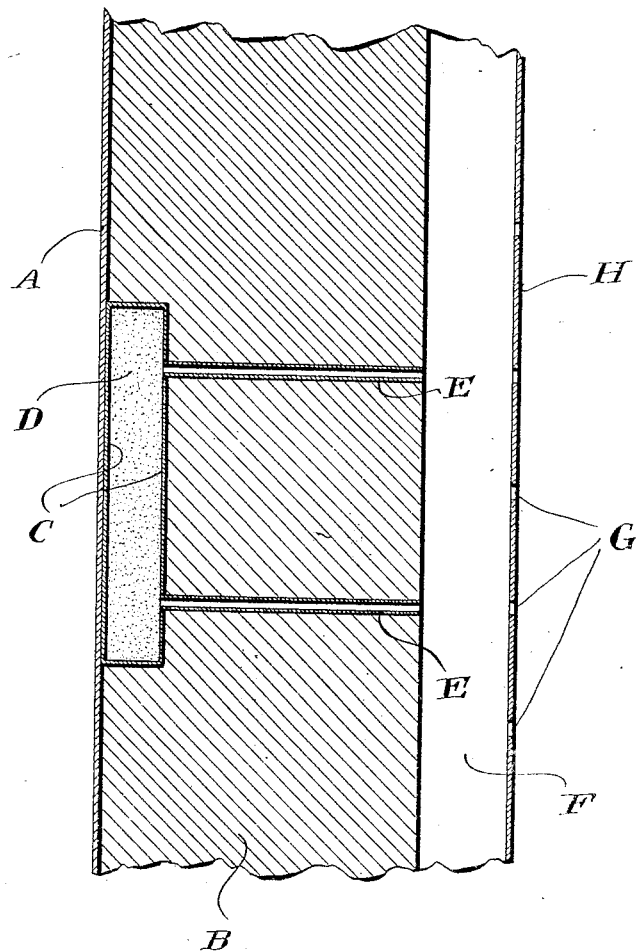

UNITED STATES PATENT OFFICE.

RALPH H. DICK AND CARL F. WOLTERS, OF MARIETTA, OHIO, ASSIGNORS TO THE SAFE-CABINET COMPANY, OF MARIETTA, OHIO, A CORPORATION OF OHIO.

HEAT-RESISTING SAFE OR CABINET.

1,336,347.  Specification of Letters Patent.  Patented Apr. 6, 1920.

Application filed June 12, 1918. Serial No. 239,534.

*To all whom it may concern:*

Be it known that we, RALPH H. DICK and CARL F. WOLTERS, both citizens of the United States, and residents of Marietta, Washington county, Ohio, have invented new and useful Improvements in Heat-Resisting Safes or Cabinets, of which the following is a specification.

This invention relates to cabinets or safes used for the protective storage against loss by fire or theft of valuable papers, records, documents or other articles, and our object has been to devise a structure of comparatively light weight, combined with strength and rigidity of construction to prevent buckling under high temperatures or injury by either a fall of any kind or rough handling, together with marked simplicity and economy in construction.

It has also been found in actual experience that under certain conditions explosions will occur inside of safes or cabinets when subjected to very high temperatures. As heat insulating materials containing either free or chemically bound moisture, are frequently employed to prevent the entrance of heat to the interior of the structure and also to wet down the contents thereof by the liberation of steam, it has been the common belief that such explosions were caused by the said steam when confined.

In other cases where the insulating material contained asbestos adulterated with vegetable matter or cork it was known that explosive gases were formed by the decomposition under heat of the said organic matter whereby methane or carbon monoxid would be generated. To determine the cause of these interior explosions and devise a remedy therefor, we have made exhaustive tests in which we used a number of safes or cabinets constructed with various kinds of insulating materials. These structures were in turn subjected to very high temperatures in a testing furnace and at short intervals samples of the gases were drawn off from the interior and analyzed. By this method we have discovered the composition of the gases and the cause of the said interior explosions.

It is a well known fact that if steam is brought in contact with red hot iron hydrogen will be generated. As iron becomes red hot at 752° Fahrenheit and the temperatures attained in our tests far exceeded that point, the steam liberated from the insulating materials acting upon the said red hot iron generated hydrogen. ($3Fe + 4H_2O = Fe_3O_4 + 4H_2$).

As hydrogen is the lightest of all gases with a very rapid rate of diffusion and great power of penetration it is obvious that when generated by the action of the steam on the red hot iron of the outer casing of the safe or cabinet it would reach the interior thereof more quickly than the steam, carbon dioxid or other gases formed simultaneously with the hydrogen and as the said interior is filled with air, a highly explosive mixture results. Any mixture with air of from five to eighty per cent. of hydrogen is explosive.

If hydrogen is mixed with air or oxygen and a flame be applied to any portion of the mixture the union of oxygen and hydrogen begins at the flame, but spreads to all places where oxygen and hydrogen are in contact, that is, throughout the whole mixture. The flame which is produced by this union spreads with great rapidity, consequently there is a sudden combining of the hydrogen with oxygen throughout the interior of the safe with the resulting explosion.

In order to start combination the temperature of a portion of the mixture must be raised to the ignition point, and to spread the combustion, it is necessary that the heat produced by the union of the two gases in one small portion of the mixture should be more than sufficient to raise the temperature of the adjacent gases to their ignition point. If however, there should be present in the mixture any gas or gases which do not take part in the reaction, and which therefore, do not aid in the production of heat, the conditions are such that there will be no explosion.

The admixture in sufficient quantities with the hydrogen and oxygen, of an inert gas acting as a diluent, will prevent an explosion.

At a temperature of 1202° F. mixtures of hydrogen and air will ignite and as in ordinary fires and during our tests a temperature of from 1500° to 2000° F. is reached it is obvious that 1202° F. would be attained at one of several possible points in the interior of the structure. The crack where the edges of the doors of the structure meet is one such location.

There are a number of ways in which it is possible to obviate the danger of these interior explosions caused by the mixture of air with the hydrogen generated by the action of the steam on the red hot iron. Vents or openings in the outer casing might permit the escape of the hydrogen to the outer air, but the highly diffusive quality and power of penetration possessed by the hydrogen, which would permit it to proceed quickly through the insulation material toward the interior of the structure would make it necessary to employ a large number of very large vents and that would tend to weaken the casing and also make it unsightly.

A gas proof barrier lining could also be employed between the outer casing where the hydrogen is generated and the interior of the safe or cabinet but this would also prevent the entrance of the steam to the interior and thereby weaken the heat resisting ability of the structure.

Any effort to seal the parts of the structure where the temperature of 1202° F. is most likely to come in contact with the mixture of hydrogen and air would be unsafe and unreliable as the great diffusibility of this gas causes it to spread throughout the entire structure and the necessary heat point might be encountered elsewhere; in addition there are so many feet of door crack that it would be impossible to seal same completely in actual practice.

The steel outer casing or the surface of the insulation adjacent to the said outer casing might be coated to prevent the contact of the steam with the red hot metal but such a coating might be destroyed by the high temperature in a fire. Metals other than steel which might be employed for the outer casing to obviate the generation of hydrogen are not practical owing to their cost.

The use in the insulating material of compounds which under heat might give off carbon dioxid, nitrogen, etc., to reduce the explosive nature of the mixture in the interior of the structure would not be effective because the penetration and rate of diffusion of the hydrogen would permit the latter to reach the interior far in advance of the other gases.

We find that the important thing to accomplish is to get non-supporters of combustion such as steam, carbon dioxid or nitrogen into the interior of the structure quickly and in large quantities.

One gram of hydrogen will provide 34,460 calories and because of this high heat of combustion a small amount of non-supporters of combustion is not effective. It is during the early period of high temperature that the greatest danger exists as the hydrogen that is generated then by the contact of the steam with the red hot iron will quickly penetrate to the interior of the safe, forming there a highly explosive gas with the air before the non-supporters of combustion can reach the interior. If then this highly explosive gas contacts with a temperature of 1202° F. an explosion is bound to occur.

Our tests have demonstrated that at high temperatures in safes or cabinets constructed with insulation materials containing moisture, hydrogen is present in the interior in sufficient amounts to be potentially explosive during the period of time beginning about ten minutes after the heat is turned on and ending about twenty minutes later thus demonstrating that during the early period of the test the hydrogen as formed penetrated to the interior in advance of the other gases and that after about thirty minutes the gases with weaker properties of diffusion also reached the interior, and mixed with the hydrogen and the air.

In the drawing herewith we show an enlarged fragmentary sectional view of a side wall of a safe or cabinet and a preferred method of introducing a gas which will not support combustion and which will in addition act to drive or sweep out of the structure the air in the interior before the hydrogen arrives.

We do not limit ourselves to the specific embodiment of the invention herein set forth as such embodiment may be varied without departure from the spirit and scope of the invention as defined in the claims.

In the drawing A indicates the steel outer wall of the safe or cabinet, B is the heat insulating material of any usual type containing moisture and C is a shallow metal pan or container filled with a substance D which under heat will liberate a non-supporter of combustion, such as carbon dioxid.

E—E are vents or open channels through which the non-supporter of combustion may escape directly and quickly to the air space F between the inner surface of the insulation material B and the inner wall H of the safe or cabinet. With some forms of insulation material this inner wall H could be omitted, but when it is used as shown herewith vents, G—G permit the entrance of the non-supporter of combustion to the interior of the safe or cabinet.

We claim:—

1. A fire-heat resisting document-preserving cabinet or safe comprising an outer metal wall, a heat insulation lining disposed adjacent thereto and containing material adapted to liberate moisture under high temperature, a container adjacent to a portion of said outer wall disposed between it and said lining and containing material which under the action of heat liberates gas which is a non-supporter of combustion, and a conduit extending from said container through said lining and permitting the quick passage of said non-supporting gas to the interior of the safe.

2. A fire-heat resisting document-preserving cabinet or safe comprising an outer metal wall, a heat insulation lining disposed adjacent thereto and containing material adapted to liberate moisture under high temperature, a container adjacent to a portion of said outer wall between it and said lining and containing material which when subjected to heat liberates carbon dioxid, and a conduit extending from said container through said lining which permits the quick passage of said non-supporting to the interior of the safe.

3. A fire-heat resisting document-preserving cabinet or safe comprising an outer metal wall, a heat insulation lining disposed adjacent thereto and containing material adapted to liberate moisture under high temperature, an inner metal wall, an air space between said inner metal wall and said insulation lining, a container disposed adjacent to a portion of said outer wall between it and said lining and containing material which under the action of heat liberates gas which is a non-supporter of combustion, and a conduit extending from said container through said lining, said inner wall having vents which together with said conduit permit the rapid passage of said gas to the interior of the safe.

RALPH H. DICK.
CARL F. WOLTERS.

Witnesses:
H. G. HISLOP,
BEMAN GEDEL.